(12) United States Patent
Ito

(10) Patent No.: US 10,009,559 B2
(45) Date of Patent: Jun. 26, 2018

(54) IMAGING APPARATUS, METHOD FOR CONTROLLING THE SAME, AND PROGRAM

(71) Applicant: CANON KABUSHIKI KAISHA, Tokyo (JP)

(72) Inventor: Shigeyoshi Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/360,368

(22) Filed: Nov. 23, 2016

(65) Prior Publication Data

US 2017/0155855 A1    Jun. 1, 2017

(30) Foreign Application Priority Data

Nov. 30, 2015    (JP) .................................. 2015-234312

(51) Int. Cl.
  *H04N 5/357*    (2011.01)
  *H04N 5/378*    (2011.01)
  *H04N 5/232*    (2006.01)
  *H04N 5/369*    (2011.01)
  *H04N 5/3745*   (2011.01)

(52) U.S. Cl.
  CPC ......... *H04N 5/357* (2013.01); *H04N 5/23212* (2013.01); *H04N 5/3696* (2013.01); *H04N 5/378* (2013.01); *H04N 5/37457* (2013.01)

(58) Field of Classification Search
  CPC .. H04N 5/357; H04N 5/37457; H04N 5/3696; H04N 5/378; H04N 5/23212
  See application file for complete search history.

(56) References Cited

U.S. PATENT DOCUMENTS 7,041,950 B2 * 5/2006 Nagano ................. G01J 1/4214
                                               250/201.2
2009/0091643 A1 * 4/2009 Aragaki ................ G06T 1/0007
                                               348/254

FOREIGN PATENT DOCUMENTS

JP           5337049 B2    11/2013

* cited by examiner

*Primary Examiner* — Mekonnen Dagnew
(74) *Attorney, Agent, or Firm* — Canon U.S.A., Inc. IP Division

(57) ABSTRACT

An imaging apparatus includes an imaging device, a readout unit, and a correction unit. The readout unit performs a first reading operation of reading out a first signal corresponding to accumulated electric charge on a pixel included in a first area of the imaging device, and performs a second reading operation of reading out a second signal corresponding to accumulated electric charge on a pixel included in a second area different from the first area. The correction unit corrects image signals based on signals obtained from the first and second areas by use of neighboring image signals obtained from neighboring pixels located near a pixel targeted for the correction process, and coefficients corresponding respectively to the neighboring pixels. The correction unit sets a coefficient corresponding to each of the neighboring pixels in accordance with the first or second reading operation executed on a neighboring pixel of the neighboring pixels.

22 Claims, 13 Drawing Sheets

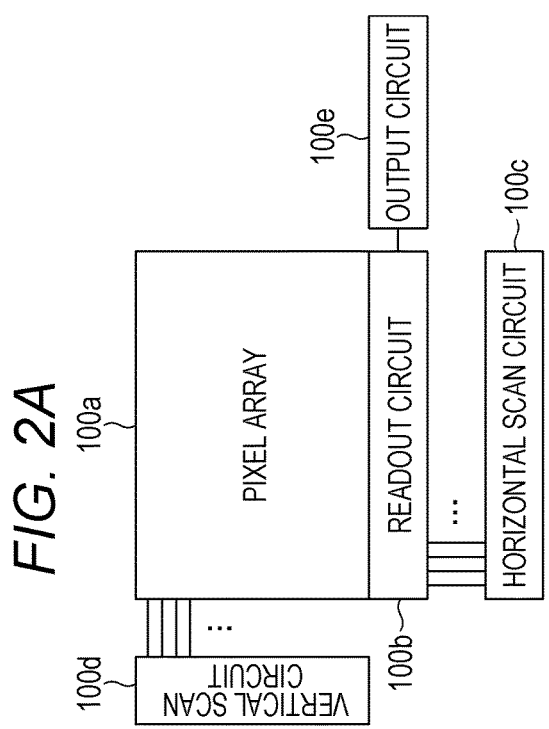
FIG. 2A
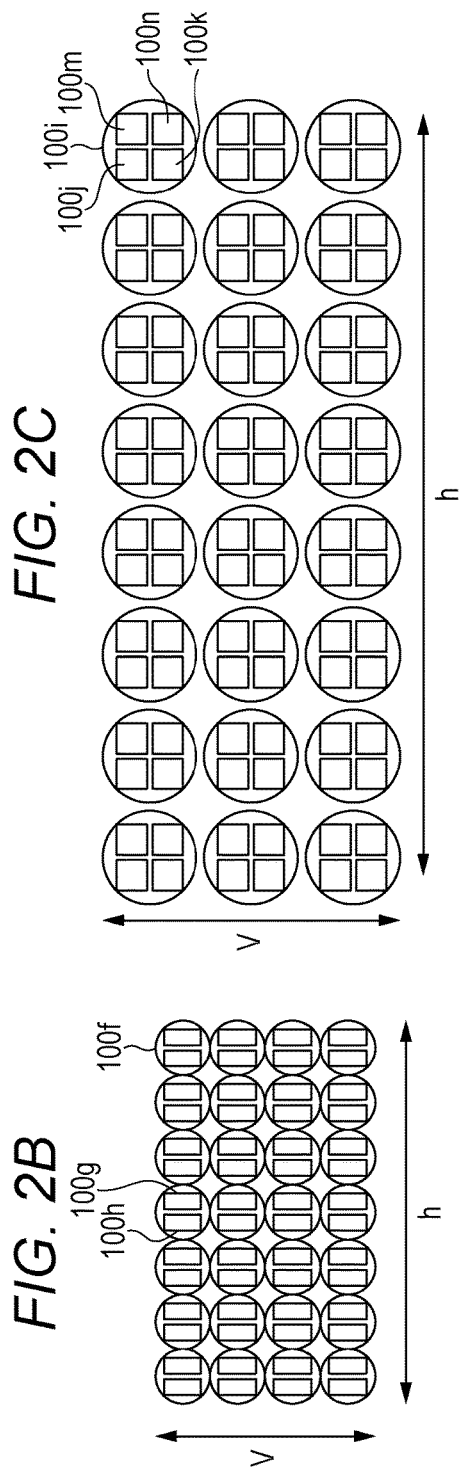
FIG. 2B
FIG. 2C

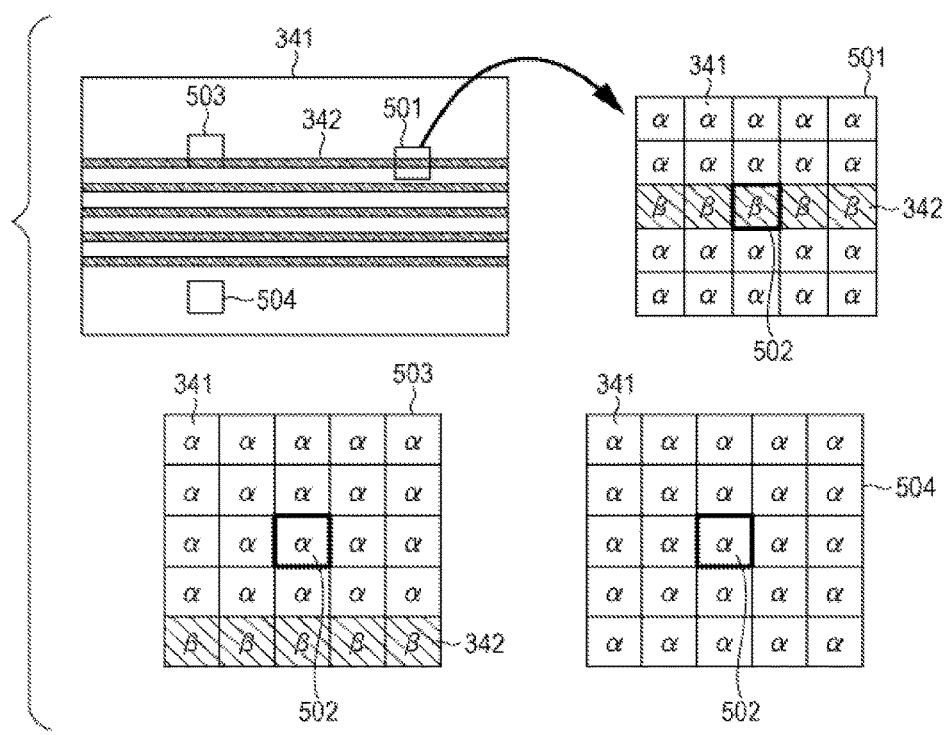

IMAGING APPARATUS, METHOD FOR CONTROLLING THE SAME, AND PROGRAM

BACKGROUND OF THE INVENTION

Field of the Invention

Aspects of the present invention relate to a technology for reducing the noise of an image signal generated by as imaging apparatus.

Description of the Related Art

Imaging devices where photoelectric conversion devices are arranged, such as image sensors, are widely used. However, a noise component may be included to reduce the quality of an image. Therefore, various noise reduction methods have been proposed.

For example, Japanese Patent No. 5337049 is knows as a method for varying a parameter of a noise reducing algorithm based on noise level in an image. Japanese Patent No. 5337049 discloses a method in which noise information is obtained as a function of coordinates in a digital image, and one or more parameters for a noise reduction process are varied based on the obtained noise information during the noise reduction process.

In recent years, imaging devices with new structures have been proposed. Even if the above noise reduction process is used, a sufficient noise reduction effect may not be able to be obtained. For example, an imaging device has been proposed which includes a plurality of pixels having a pupil-division function of an imaging optical system that forms an optical image of a subject, and enables focus detection by phase difference detection with an image signal. In an imaging apparatus using such an imaging device, signals for focus detection are not necessarily required to be read out from an entire image. The signals for focus detection may be read out only from a partial area.

However, if an area where the signal for focus detection is read out and an area where a signal for image generation is read out coexist in the same image, the amounts of noise superimposed on image signals corresponding respectively to both areas are different. The reason of it is briefly described taking one example. The example a case where one pixel includes two photodiodes that achieve the pupil-division function in the area where the signal for focus detection is read out, a signal obtained from one photodiode is output first, and then signals obtained from two photodiodes are added to be output. By contrast, in the area where the signal for image generation is read out, only an operation of adding signals obtained from the two photodiodes and outputting the resultant signal is performed. In the area where the signal for focus detection is read out, the signal output operation is performed twice; therefore, it takes a longer time between the performance of a reset operation and the completion of readout than in the area where the signal for image generation is read out and where the signal output operation is performed only once. Consequently, the operating frequency between signals is reduced and flicker noise increases. Hence, focus is detected only in a part of an image and the signal for focus detection is read out only in a partial area, there arises a problem that a noise texture changes between the area where signal for focus detection has been read out and the area where signal for focus detection has not been read out.

In the signal processing method described in Japanese Patent No. 5337049, the noise level information as a function of coordinates is used to attempt noise reduction. However, no consideration is given to a case where a different signal reading operation is applied according to different areas in the same image.

SUMMARY OF THE INVENTION

According to an aspect of the present invention, an imaging apparatus includes an imaging device, a readout unit configured to perform a first reading operation of reading out a first signal corresponding to accumulated electric charge on a pixel included in a first area of the imaging device, and perform a second reading operation of reading out a second signal corresponding to accumulated electric charge on a pixel included in a second area different from the first area, wherein the second reading operation is different from the first reading operation, and a correction unit configured to correct, in a correction process, image signals based on signals obtained from the first and second areas by use of neighboring image signals obtained from a plurality of neighboring pixels located near a pixel targeted for the correction process, and coefficients corresponding respectively to the plurality of neighboring pixels, wherein the correction unit sets a coefficient corresponding to each of the plurality of neighboring pixels in accordance with the first or second reading operation executed on a neighboring pixel of the plurality of neighboring pixels.

Further features of the present invention will become apparent from the following description of exemplary embodiments (with reference to the attached drawings).

BRIEF DESCRIPTION OF THE DRAWINGS

FIG. 2A is a diagram illustrating the configuration of an imaging device used in the imaging apparatus according to an embodiment, and FIGS. 2B and 2C are diagrams illustrating the configuration of a pixel array according to an embodiment.

FIGS. 7A and 7B-1 and 7B-2 are diagrams for explaining the setting of weighted coefficients based on a change of a reading device according to a first embodiment.

DESCRIPTION OF THE EMBODIMENTS

Embodiments are described in detail hereinafter with reference to the accompanying drawings. Configurations illustrated in the following embodiments are mere examples. The present invention is not limited to the illustrated configurations.

(First Embodiment)

Figure 1:
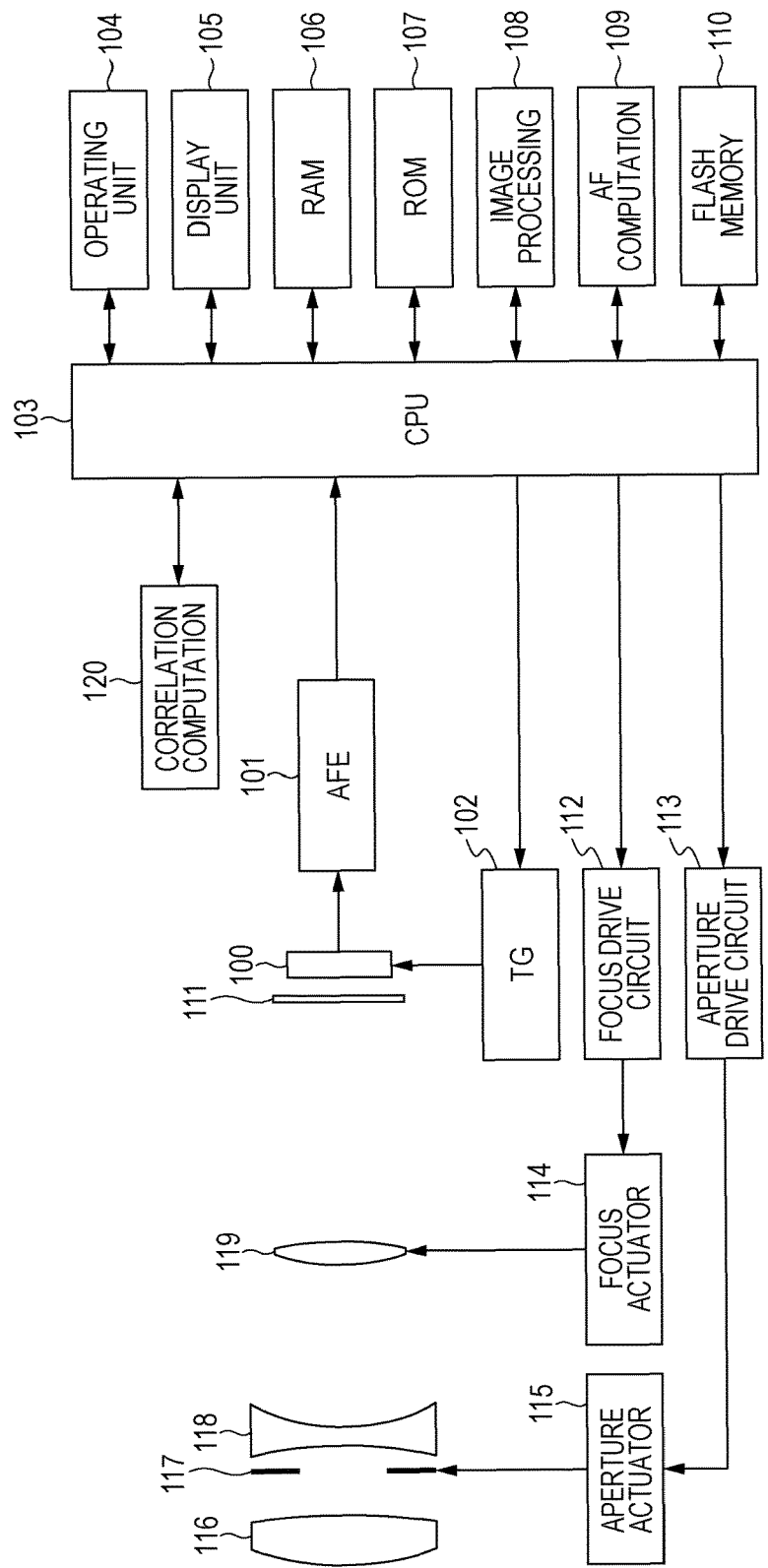
FIG. 1 is a diagram illustrating the configuration of an imaging apparatus according to an embodiment.

FIG. 1 is a block diagram illustrating the configuration of an imaging apparatus according to a first embodiment. In FIG. 1, an imaging device 100 photoelectrically converts an optical image of a subject formed by an imaging optical system into an electrical signal. The imaging device 100 is controlled by, for example, a central processing unit 103 described below, and captures a still image or movie. An analog front end (hereinafter referred to as AFE) 101 converts an analog image signal output from the imaging device 100 to digital signal in accordance with the gain adjustment and the quantization bit rate. A timing generator (hereinafter referred to as TG) 102 controls the drive timings of the imaging device 100 and the AFE 101. In the embodiment, the AFE 101 and the TG 102 are placed outside the imaging device 100. However, a configuration where the AFE 101 and the TG 102 are integrated in the imaging device is also acceptable.

As described above, the central processing unit (hereinafter referred to as CP) 103 executes a program to control units of the imaging device. An operating unit 104 sets an imaging instruction, an imaging condition, and the like for the CPU 103. A display unit 105 displays a captured still image and movie, a menu, and the like. A random-access memory (RAM) 106 functions as both an image data storage device for storing image data digitally converted by the AFE 101 and image data processed by an image processing unit 108 described below, and working memory upon the operation of the CPU 103. In the embodiment, these functions are implemented using the RAM 106. However, another memory at a level of a sufficient access speed with no problem in operation can also be applied. A read-only memory (ROM) 107 stores a program to be loaded and executed to have the CPU 103 control the operation of the units, and coefficient groups used in a noise reduction circuit described below. In the embodiment, flash memory is illustrated, which is an example. Another memory at a level of a sufficient access speed with no problem in operation can also be applied. The image processing unit 108 performs processes such as correction and compression on a captured still image or movie. Moreover, the image processing unit 108 has a function of separating Image A data and Image B data, which is described below, an image correction function described below, and a function of generating a still image and a movie.

An autofocus (AF) computation unit 109 calculates the drive amount of a focus lens using a correlation computation result output from a correlation computation unit 120. A flash memory 110 is detachable flash memory for recording still image data and movie data. In the embodiment, flash memory is applied as a recording medium. However, another data-writable nonvolatile memory is also acceptable. Moreover, these recording media may be integrated.

A focal plane shutter 111 adjusts the exposure time when a still image is captured. In the embodiment, the focal plane shutter is configured to adjust the exposure time of the imaging device 100. However, embodiments are not limited to this configuration. It may be a configuration where the imaging device 100 has an electronic shutter function to adjust the exposure time with a control pulse. A focus drive circuit 112 changes the focal position of an optical system. The focus drive circuit 112 controls the drive of a focus actuator 114 based on a focus detection result of the AF computation unit 109, drives a third lens 119 to move frontward/backward in an optical axis direction, and accordingly adjusts the focus. An aperture drive circuit 113 controls the drive of an aperture actuator 115 to control the aperture diameter of a diaphragm 117. A first lens 116 is placed at an end of the imaging optical system. (common optical system), and held movably in the optical axis direction. The diaphragm 117 adjusts the light amount upon image capture by the adjustment of the aperture diameter. The diaphragm 117 and a second lens 118 move frontward/backward together in the optical axis direction to achieve the magnification operation (zoom function) in synchronization with the frontward/backward movement operation of the first lens 116. The third lens 119 adjusts the focus of the imaging optical system with the frontward/backward movement in the optical axis direction. The correlation computation unit 120 calculates correlation using a pixel signal output from the imaging device 100.

Next, the configuration of the imaging device 100 is described with reference to FIGS. 2A to 2C. FIG. 2A illustrates the configuration of the imaging device 100. In FIG. 2A, the imaging device 100 includes a pixel array 100a where pixels are arranged two-dimensionally, a vertical scan circuit 100d that selects a row of pixels of the pixel array 100a, and a horizontal scan circuit 100c that selects a column of pixels of the pixel array 100a. Moreover, the imaging device 100 further includes a readout circuit 100b for reading out a signal of a pixel selected by the vertical scan circuit 100d and the horizontal scan circuit 100c from the pixels of the pixel array 100a. The vertical scan circuit 100d selects a row of the pixel array 100a, and enables, in the selected row, a read pulse output from the TG 102 based on a horizontal synchronization signal output from the CPU 103. The readout circuit 100b includes an amplifier and a memory, which are provided to each column, and stores a pixel signal of a scan row in the memory via the amplifier. The pixel signals of one row stored in the memories are sequentially selected by the horizontal scan circuit 100c in a column direction to be output to the outside via an output circuit 100e. This operation is repeated to output signals of all the pixels to the outside.

The pixel array 100a of the imaging device 100 is illustrated in FIG. 2B. In FIG. 2B, a microlens array includes microlenses 100f. Photodiodes (PDs) 100h and 100g configure a photoelectric conversion unit for the image A and a photoelectric conversion unit for the image B, which are described below, as a photoelectric conversion device that performs a photoelectric conversion. Each pixel is configured such that one microlens 100f is placed over two PDs. In other words, a focus detection pixel includes a plurality of photoelectric conversion units for one microlens. When an imaging area sharing the microlens 100f is assumed to be one pixel, the pixel array 100a includes h pixels arranged in the horizontal direction and v pixels arranged in the vertical direction. Signals accumulated in the PDs 100h and 100g are simultaneously or separately converted into a voltage signal by a pixel transfer operation described below, and output to the outside by the reading operation described above. The PDs 100h and 100g have a pupil-division configuration. Different images of different phases enter the PDs 100h and 100g. Hence, the signals of the PDs 100h and 100g are read out separately. The above-mentioned correlation computation unit 120 performs a correlation computation process on the signals, the result of which enables the above-mentioned AF computation unit 109 to calculate the drive amount of the focus lens, and the like. The PD 100h is assumed to be the photoelectric conversion unit for image A, and the PD 100g to be the photoelectric conversion unit for image B. In FIG. 2B, it is configured such that one microlens is placed for two PDs. However, embodiments are not limited to this configuration. Embodiments can be applied even to a configuration where a plurality of PDs is placed vertically or horizontally for one microlens. Moreover, embodiments can also be applied to a pupil-division configuration where three or more PDs are placed for one microlens.

In the following description, the embodiment is described taking a configuration where two PDs are placed for one microlens. However, as described above, embodiments should not be interpreted limited to the form where two PDs are placed. For example, FIG. 2C illustrates an example where four PDs are placed. A pixel 100i includes pupil-division PDs 100j, 100k, 100m, and 100n. Images of different phases enter the PDs 100j, 100k, 100m, and 100n respectively, from each of which a signal can be read out separately. Alternatively, it is also possible to add signals of the PDs 100j and 100k and read out the resultant signal, and add signals of the PDs 100m and 100n and read out the resultant signal. Therefore, a phase difference in the horizontal direction can be acquired after the computation at the correlation computation unit 120. Alternatively, signals of the PDs 100j and 100m are added to be read out, and signals of the PDs 100k and 100n are added to be read out. Therefore, a phase difference in the vertical direction can be acquired after the computation at the correlation computation unit 120; accordingly, the signals obtained from the PDs can be used for phase difference detection.

Figure 3:
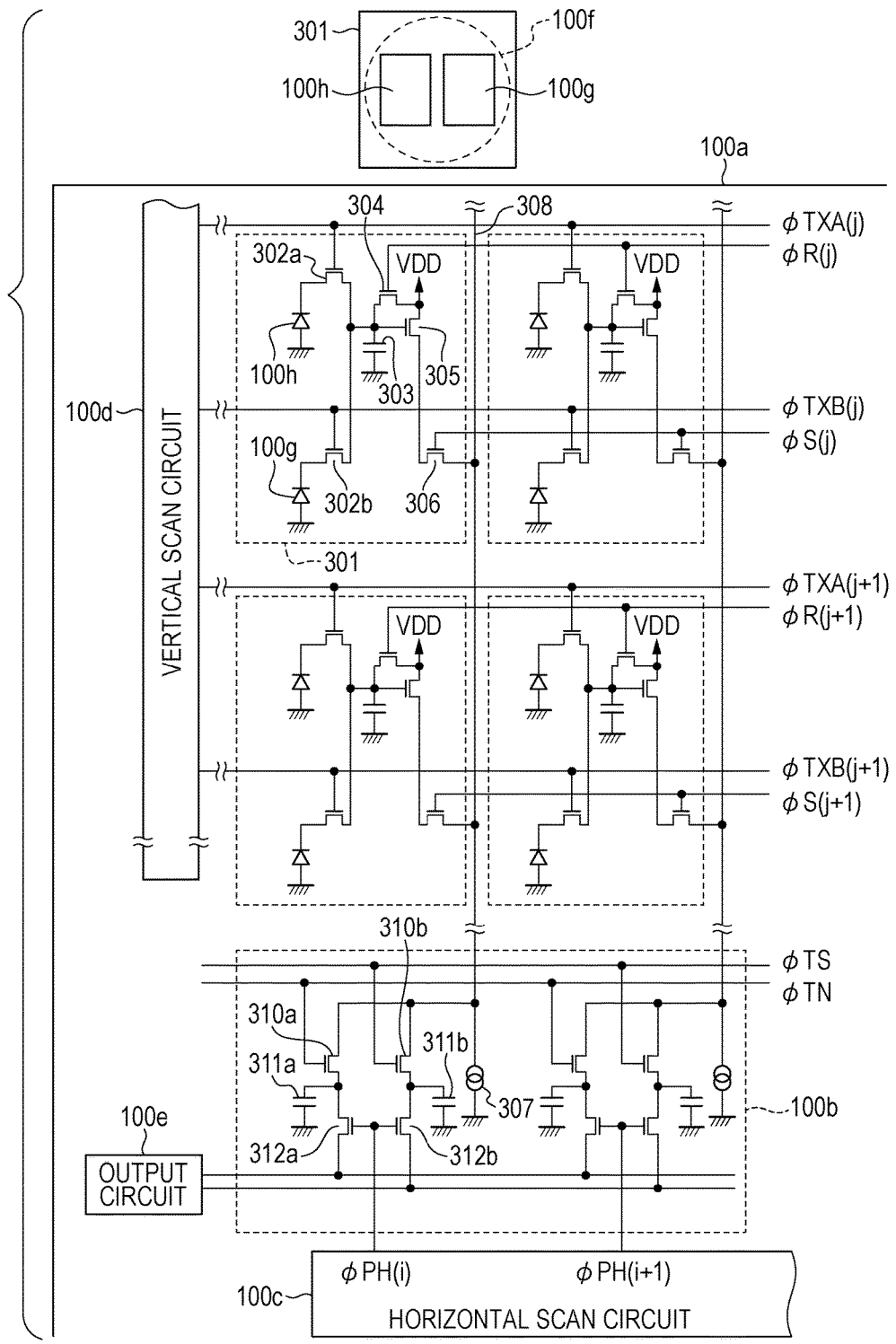
FIG. 3 is a diagram illustrating the configuration of the imaging device according to an embodiment.

FIG. 3 is an equivalent circuit diagram illustrating pixels of adjacent two rows (a row j and a row (j+1)) and two columns (a column i and a column (i+1)) among the plurality of pixels provided to the pixel array 100a, and the configuration of the readout circuit 100b for the two columns (the column i and the column (i+1)).

A control signal ΦTXA(j) is input into transfer switches 302a of pixels 301 in the j-th row. A control signal ΦTXB(j) is input into gates of transfer switches 302b. A reset signal ΦR(j) controls reset switches 304. The control signals ΦTXA(j) and ΦTXB(j), the reset signal ΦR(j), and a row selection signal ΦS(j) are controlled by the vertical scan circuit 100d. Similarly, control signals ΦTXA(j+1) and ΦTXB(j+1), a reset signal ΦR(j+1), and a row selection signal ΦS(j+1) control pixels 320 in the (j+1)-th row.

Moreover, a vertical signal line 308 is provided to each pixel column. Each vertical signal line 308 is connected to a current source 307 and transfer switches 310a and 310b, which are provided to each column, of the readout circuit 100b.

A control signal ΦTN is input into gates of the transfer switches 310a. A control signal ΦTS is input into gates of the transfer switches 310b. Moreover, a control signal ΦPH(i) output from the horizontal scan circuit 100c is input into gates of transfer switches 312a and 312b. An accumulation capacitor portion 311a accumulates the output of the vertical signal line 308 when the transfer switch 310a is in the ON state and the transfer switch 312a is in the OFF state. Similarly, an accumulation capacitor portion 311b accumulates the output of the vertical signal line 308 when the transfer switch 310b is in the ON state and the transfer switch 312b is in the OFF state.

The column selection signal ΦPH(i) of the horizontal scan circuit 100c turns on the transfer switches 312a and 312b in the i-th column to transfer the outputs of the accumulation capacitor portions 311a and 311b to the output circuit 100e via different horizontal output lines, respectively.

An addition reading operation (first reading operation) and a division reading operation (second reading operation) can be selectively performed as the reading operations of reading a signal from the imaging device 100 with the above configuration. The addition reading operation and the division reading operation are described below with reference to FIGS. 3 and 4A and 4E. In the embodiment, description is given assuming that the switches are turned on when the control signals are at H (high), and are turned off when the control signals are at L (low).

<Addition Reading Operation> (First Reading Operation)

Figure 4A:
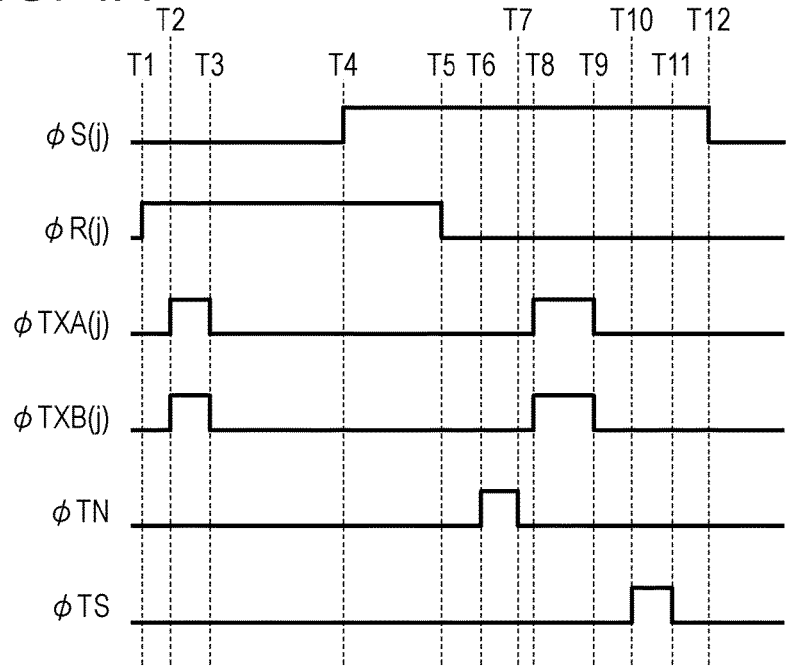
FIGS. 4A and 4B are diagrams illustrating the timing of a reading operation of the imaging device according to an embodiment.

FIG. 4A illustrates a timing of the operation of reading a signal from pixels in the j-th row of the imaging device 100 by the addition reading operation. At time T1, the reset signal ΦR(j) is changed to H. Next, at time T2, the control signals ΦTXA(j) and ΦTXB(j) are changed to H to reset the PDs 100h and 100g of the pixels 301 in the j-th row.

Next, at time T3, the control signals ΦTXA(j) and ΦTXB(j) are changed to L. The PDs 100h and 100g then start accumulating electric charge. Next, at time T4, the row selection signal ΦS(j) is changed to H. Row selection switches 306 are turned on to connect to the vertical signal lines 308. Source follower amplifiers 305 are activated.

Next, after the reset signal ΦR(j) is changed to L at time T5, the control signal ΦTN is changed to H at time T6. The transfer switches 310a are then turned on. Signals (noise signals) after the release of the reset on the vertical signal lines 308 are transferred to the accumulation capacitor portions 311a.

Next, at time T7, the control signal ΦTN is changed to L to hold the noise signals in the accumulation capacitor portions 311a. At time T8, the control signals ΦTXA(j) and ΦTXB(j) are then changed to H. The electric charge of the PDs 100h and 100g is transferred to floating diffusion regions (FD regions) 303. At this point in time, the electric charge of the two PDs 100h and 100g is transferred to the same FD region 303; accordingly, a signal obtained by mixing the electric charge of the two PDs 100h and 100g (an optical signal+a noise signal of one pixel) is output to the vertical signal line 308.

Next, at time T9, the control signals ΦTXA(j) and ΦTXB(j) are changed to L. At time T10, the control signal ΦTS is subsequently changed to H to turn on the transfer switches 310b. The signals (the optical signal+the noise signal of one pixel) on the vertical signal lines 308 are transferred to the accumulation capacitor portions 311b. Next, at time T11, the control signal ΦTS is changed to L to hold the optical signal+the noise signal of one pixel in the accumulation capacitor portion 311b. At time T12, the row selection signal ΦS(j) is then changed to L.

The column selection signals ΦPH of the horizontal scan circuit 100c are subsequently changed to H. Accordingly, the transfer switches 312a and 312b are sequentially turned on from the first pixel column to the last pixel column. Consequently, the noise signal of the accumulation capacitor portion 311a, and the optical signal+the noise signal of one pixel of the accumulation capacitor portion 311b are transferred to the output circuit 100e via different horizontal output lines, respectively. In the output circuit 100e, a difference between the two horizontal output lines (the optical signal of one pixel) is calculated to output a signal obtained by multiplying the difference by a predetermined gain. The signal obtained by the above-mentioned addition readout is called the "first addition signal" below.

<Division Reading Operation> (Second Reading Operation)

Figure 4B:
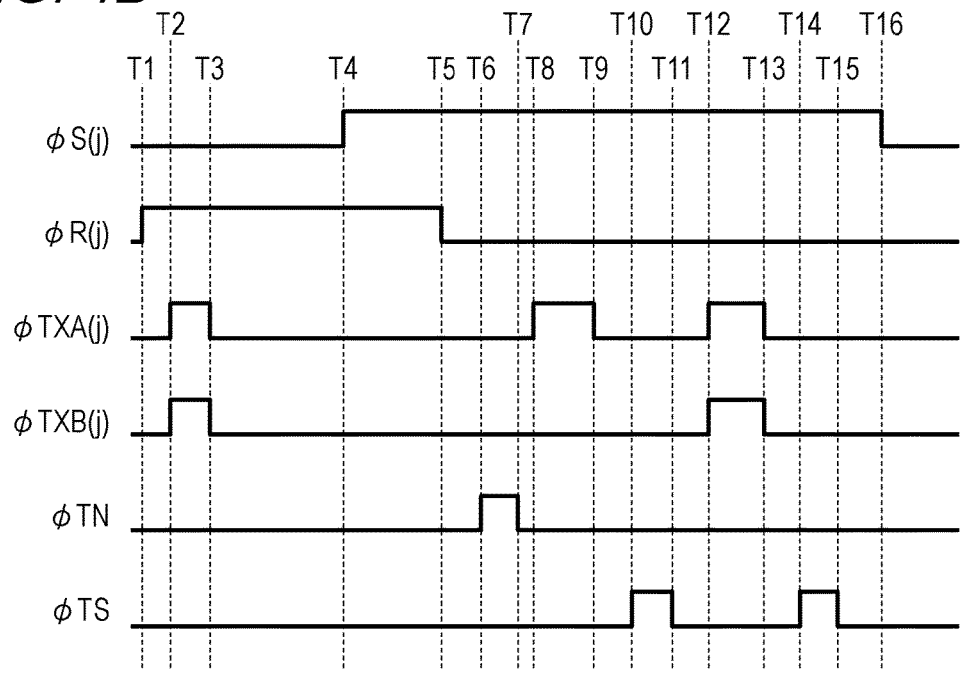

Next, the division reading operation is described with reference to FIG. 4B. FIG. 4B illustrates a timing of the operation of reading a signal from pixels in the j-th row of the imaging device 100 by the division reading operation. At time T1, the reset signal ΦR(j) is changed to H. Next, at time T2, ΦTXA(j) and ΦTXB(j) are changed to H. The PDs 100h and 100g of the pixels 301 in the j-th row are reset. Next, at time T3, the control signals ΦTXA(j) and ΦTXB(j) are changed to L. The PDs 100h and 100g start accumulating electric charge. Next, at time T4, the row selection signal ΦS(j) is changed to H. The row selection switches 306 are then turned on to connect to the vertical signal lines 308. The source follower amplifiers 305 are activated.

After the reset signal ΦR(j) is changed to L at time T5, the control signal ΦTN is changed to H at time T6. The transfer switches 310a are then turned on. The signals (noise signals) after the release of the reset on the vertical signal lines 308 are transferred to the accumulation capacitor portions 311a.

Next, at time T7, the control signal ΦTN is changed to L to hold the noise signals in the accumulation capacitor portions 311a. At time T8, 1 TXA(j) is subsequently changed to H. The electric charge of the PDs 100h is then transferred to the FD regions 303. At this point in time, the electric charge of one (here, the PD 100h) of the two PDs 100h and 100g is transferred to the FD region 303; accordingly, only a signal corresponding to the electric charge of the PD 100h is output to the vertical signal line 308.

Next, after the control signal ΦTXA(j) is changed to L at time T9, the control signal ΦTS is changed to H at time T10. The transfer switch 310b is then turned on. Signals (an optical signal a noise signal of one PD) on the vertical signal lines 308 are transferred to the accumulation capacitor portions 311b. Next, at time T11, the control signal ΦTS is changed to L.

The column selection signals ΦPH of the horizontal scan circuit 100c are sequentially changed to H afterward. Accordingly, the transfer switches 312a and 312b are sequentially turned on from the first pixel column to the last pixel column. Consequently, the noise signal of the accumulation capacitor portion 311a, and the optical signal+the noise signal of one PD of the accumulation capacitor portion 311b are transferred to the output circuit 100e via different horizontal output lines, respectively. In the output circuit 100e, a difference between the two horizontal output lines (the optical signal of one PD) is calculated to output a signal obtained by multiplying the difference by a predetermined gain. The signal obtained by the above-mentioned readout is called the "division signal" below.

At time T12, ΦTXA(j) and ΦTXB(j) are subsequently changed to H. The electric charge of the PD 100g and the newly generated electric charge of the PD 100h, in addition to the previously transferred electric charge of the PD 100h, are further transferred to the PD region 303. At this point in time, the electric charge of the two PDs 100h and 100g is transferred to the same PD region 303; accordingly, a signal (an optical signal+a noise signal of one pixel) obtained by adding the electric charge of the two PDs 100h and 100g is output to the vertical signal line 308.

Next, at time T13, the control signals ΦTXA(i) and ΦTXB(1) are changed to L. At time T14, the control signal ΦTS is subsequently changed to H. The transfer switch 310b is then turned on. Consequently, the signal (the optical signal+the noise signal of one pixel) on the vertical signal line 308 is transferred to the accumulation capacitor portion 311b.

Next, at time T15, the control signal ΦTS is changed to L to hold the optical signal+the noise signal of one pixel in the accumulation capacitor portion 311b. At time T16, the row selection signal ΦS(j) is then changed to L.

The column selection signals ΦPH of the horizontal scan circuit 100c are sequentially changed to H afterward. Accordingly, the transfer switches 312a and 312b are sequentially turned on from the first pixel column to the last pixel column. Consequently, the noise signal and the optical signal+the noise signal of one pixel of the accumulation capacitor portions 311a and 311b are transferred to the output circuit 100e via the different horizontal output lines, respectively. In the output circuit 100e, a difference between the two horizontal output lines (the optical signal of one pixel) is calculated to output a signal obtained by multiplying the difference by a predetermined gain. The signal obtained by the above-mentioned readout is called the "second addition signal" below to be distinguished from the first addition signal.

The division signal corresponding to one of the PDs—the PD 100h—is subtracted from the second addition signal read out in this manner. Accordingly, the division signal corresponding to the other PD 100g can be obtained. A pair of the division signals obtained in this manner is called the "focus detection signal." A known correlation computation is performed on the obtained focus detection signal. Accordingly, a phase difference between the signals can be calculated.

It may also be configured such that a series of operations—resetting, charge accumulation, and reading of a signal—is performed on the PD 100h first, and then the similar operations are performed on the PD 100g to read signals from the two PDs 100h and 100g separately in respective charge accumulation operations. The signals that have been read out from the PDs 100h and 100g at two different times in this manner are added; accordingly, the second addition signal can be obtained. Moreover, as also described above, embodiments are not limited to the configuration where two PDs are placed for one microlens. Signals of three or more PDs may be read out over several times and then combined.

The second addition signal has larger readout noise than the first addition signal. For example, if signals of the two PDs 100h and 100g are added to be read out, when the second addition signal is acquired, a noise signal is read out first. Electric charge of one of the two PDs 100h and 100g is transferred to the PD region 303 to read a signal. Without resetting the FD region 303 afterward, signals of the two PDs 100h and 100g are added and read out to obtain the second addition signal. In this method, it takes a longer time between the reading of the noise signal and the reading of the second addition signal than the reading for the first addition signal. Accordingly, the operating frequency between the signals is reduced to increase flicker noise.

Moreover, for example, if the signals of the PDs 100h and 100g are read out separately, the signals are read out from a single pixel at two different times and added to obtain a pixel signal. Accordingly, readout noise is superimposed twice. Hence, the readout noise is increased as compared to the first addition signal.

Figure 5A:
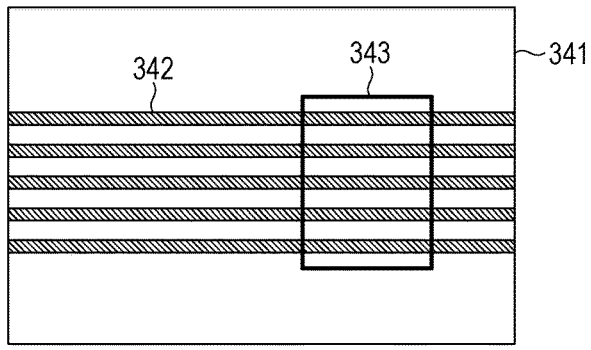
FIG. 5A is a diagram illustrating an example of a combination reading operations according to an embodiment.

FIG. 5A illustrates an example of a combination of the reading operations. As described above, the switches 302a and 302b are controlled to enable the switching between the addition reading operation and the division reading operation. The division reading operation is performed only on a part of pixels in an image by switching the reading operation in the image; accordingly, focus can be detected only in a part of the image. Such a part of the image in which focus is detected is assumed to be a focus detection area. Consequently, it is possible to reduce the time required for processing as compared to a case where the division reading operation is performed on all the pixels of the image. In an area 342, the division reading operation that reads out an image A signal and then reads out an image A signal and an image B signal together is performed to obtain the focus detection signal. The area 342 is determined by the position of a focus measuring frame described below. In an area 341 being an area other than the area 342, the addition reading operation that reads out the image A signal and the image B signal together is performed. FIG. 5A illustrates the switching of the reading operation on a line-by-line basis. However, embodiments are not limited to this. For example, an image may be divided into a plurality of rectangular areas to switch the reading operation on an area-by-area bass.

An area 343 indicates the focus measuring frame upon capturing of this image. How to determine the area 343 in a camera operation is described below. In the embodiment, the example where a plurality of lines placed evenly is set to an area where the division reading operation is performed, on the lines superimposed by the area 343 being the focus measuring frame is cited as the example of a combination of the reading operations as illustrated in FIG. 5A. However, embodiments are not limited to this example. For example, all the lines superimposed by the area 343 being the focus measuring frame may be set as the area where the division reading operation is performed, or only an area superimposed by the focus measuring fame as the area where the division reading operation is performed.

Figure 5B:
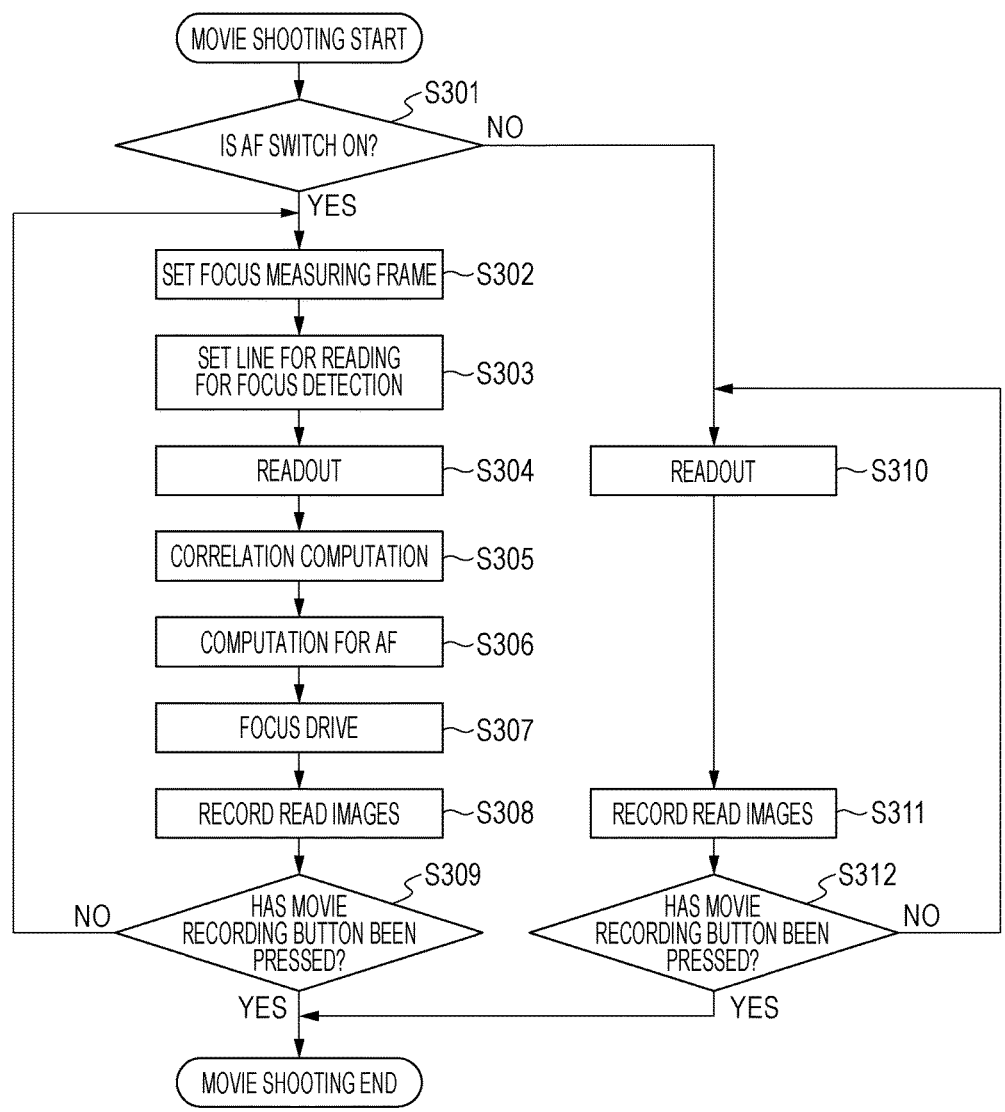
FIG. 5B is a flowchart related to the reading operation of movie capture according to an embodiment.

FIG. 5B is a flowchart related to the reading operation of movie capture. A movie recording button included in the operating unit 104 is pressed in movie mode to enable the start of movie capture. When a movie starts being captured, the state of an AF switch is checked in step S301. When in the OFF state (NO at step S301), the movie is captured in manual focus (MF) mode. After the determination in step S301, a transition is made to step S310. There is no need to perform the division reading operation to obtain the focus detection signal; accordingly, the addition reading operation that simultaneously reads out the image A signal and the image B signal is performed on ail the pixels. The images read out in step S311 are then saved in the RAM 106. Next, a transition is made to step S312. If the movie recording button is pressed during a series of sequences (YES at step S312), the movie ends being captured. If not (NO at step S312), the next frame starts being read out at step S310.

On the other hand, upon the determination in step S301, if the AF switch is determined to be in the ON state (YES at step S301), the movie is captured in movie servo AF mode. In step S302, the area 343 being the focus measuring frame is set. The area 343 is simply required to be set using a conventionally known method. For example, the position of the area 343 may be set affected by a user's touchscreen or dial operation. Alternatively, a tracking process may be performed on a subject included in an image to detect the position of the subject in a new frame, and then the area 343 may be set based on the detected position of the subject and the size. In step S303, the area 342 where the reading operation for focus detection is performed is set in accordance with the area 343 set in step S302.

In step S304, a signal of each pixel is read out based on the reading operation set in step S303. In step S304, the CPU 103 drives the TG 102, controls the vertical scan circuit 100d and the switches 302a and 302b, and reads out a signal. Specifically, in the area 342, a part of rows included in the area 343 being the focus measuring frame turns on only the switch 302a first to read out the image A signal, and then the switches 302a and 302b are simultaneously turned on to simultaneously read out the image A signal and the image B signal. These signals and the signal obtained by turning on only the switch 302a are used to enable the image processing unit 108 described below to calculate the image B signal. Therefore, both of the image A signal and the image B signal are acquired to use them as the focus detection signal. In the rows other than that (the area 341), the switches 302a and 302b are simultaneously turned on to simultaneously read out the image A signal and the image B signal. When such a reading operation is performed, the row where the reading operation for focus detection is performed changes according to the setting of the focus measuring frame.

In step S305, the correlation computation unit. 120 calculates correlation based on the signals read out in step S304. In step S306, the AF computation unit 109 carries out a computation for AS based on the correlation computation result of step S305. A description of specific methods for the correlation computation and the computation for AF is omitted here. In step S307, the result of the computation for AF is transmitted to the focus drive circuit 112 for focus drive.

In step S308, the images read in step S304 are saved in the RAM 106. A transition is made to step S309 after recording. Step S309 is the step of determining whether or not the movie recording button has been pressed during a series of sequences. If the movie recording button has been pressed (YES at step S309), the movie recording ends. If not (NO at step S309), similar operations are repeated from step S302.

Figure 6A:
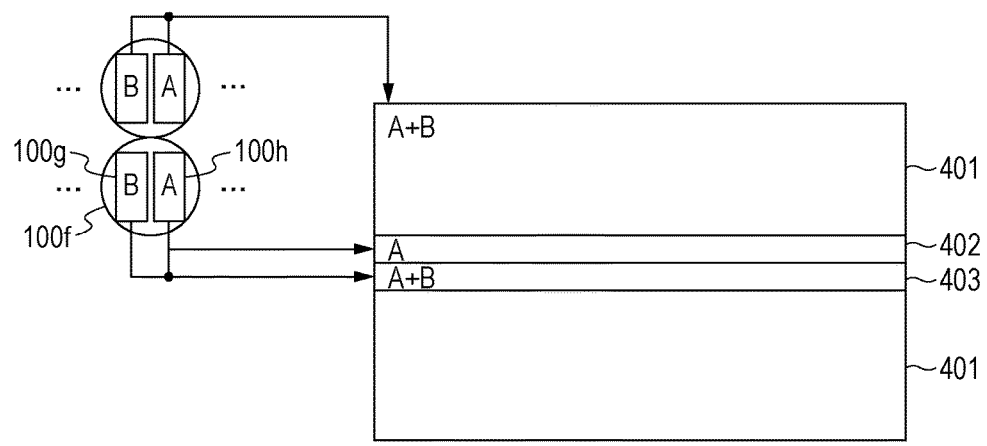
FIG. 6A is a diagram illustrating a signal input into an image processing unit on a line-by-line basis according to an embodiment.

FIG. 6A is a diagram illustrating signals input into the image processing unit 108. In a line where the addition reading operation has been performed, the signals for images A+B are sequentially input into the image processing unit 108 on a line-by-line basis. By contrast, in a line where the division reading operation has been performed, the signal for image A read out from a pixel in the line is input into the image processing unit 108 first, and then the signals for images A+B read out from the pixel in the same line are input into the image processing unit 108. In other words, in FIG. 6A, an area 401 indicates the signals for images A+B read out from the line where the addition reading operation has been performed. Similarly, an area 402 indicates the image A signal read out from the line where the division reading operation has been performed. An area 403 indicates the image A and image B signals read out from the line where the division reading operation has been performed.

Figure 6B:
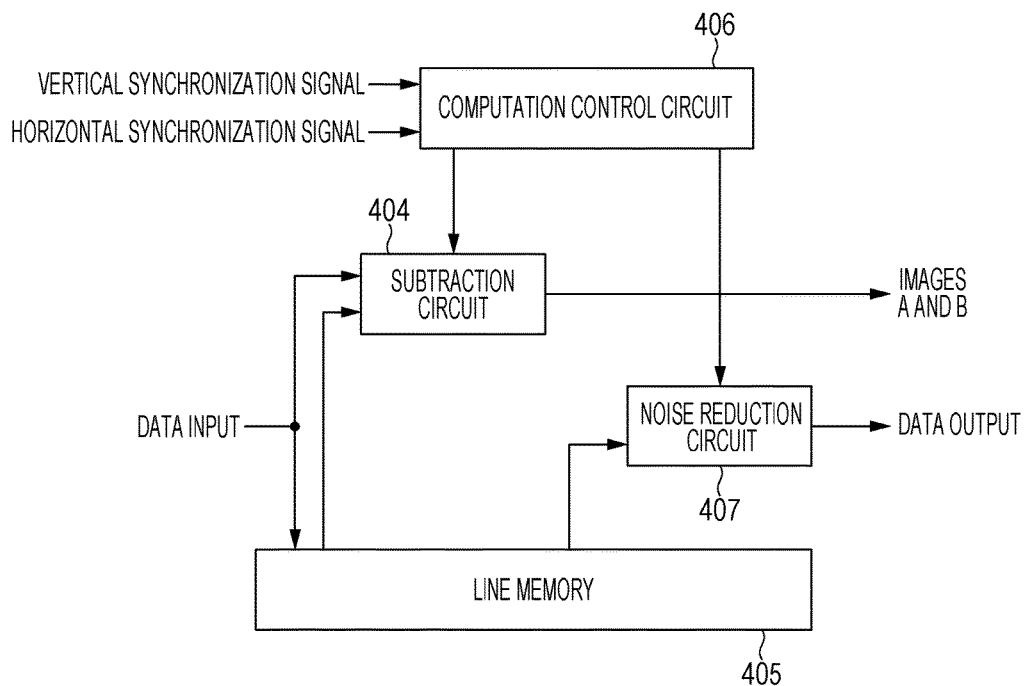
FIG. 6B is a diagram illustrating the configuration of the image processing unit according to an embodiment.

FIG. 6B is a diagram illustrating the configuration of the image processing unit 108. A signal input into the image processing unit 108 is stored in a line memory 405 irrespective of whichever reading operation has been used to be read out from the pixel. A computation control circuit 406 identifies the position of a pixel with a vertical synchronization signal and a horizontal synchronization signal, and instructs a subtraction circuit 404 and a noise reduction circuit 407 about a process in accordance with the reading operation of each pixel. Among the input signals, the signals for images A+B of a pixel where the division reading operation has been performed are not only input into the line memory 405 but also read out by the subtraction circuit 404. When the signals for images A+B have been input, the subtraction circuit 404 reads out, from the line memory 405, the signal for image A read out first from the same pixel as the pixel from which the signals for images A+B have been read out, subtracts the image A signal from the signals for images A+B, and accordingly generates a signal for image B. The subtraction circuit 404 then outputs, to the correlation computation unit 120 illustrated in FIG. 1, the signal for image A read out from the line memory 405 and the generated signal for image B.

The noise reduction circuit 407 reads out, from the line memory 405, a signal of a pixel targeted for a noise reduction process and signals of neighboring pixels in a predetermined area located in the vicinity of the process target pixel to perform the noise reduction process on the process target pixel. The computation control circuit 406 causes the noise reduction circuit 407 to perform a different computation process according to which of the addition reading operation and the division reading operation has been performed on each of the process target pixel and its neighboring pixels for reading.

The process of the noise reduction circuit 407 is described with reference to FIGS. 7A to 9. The noise reduction circuit 407 in the embodiment is a method for calculating a weighted average using a pixel targeted for the noise reduction process and its neighboring pixels and substituting a pixel value of the pixel targeted for the noise reduction process using the weighted average value.

FIG. 7A illustrates the reading operations of the imaging device and a process window of the noise reduction circuit 407 according to the embodiment. The above-mentioned noise reduction circuit 407 calculates the above-mentioned weighted average using pixels within an area indicated by a window 501. A process target pixel 502 is corrected with the weighted average value to perform the noise reduction process. In the window 501, only a line including the process target pixel 502 is the line on which the division reading operation has been performed. In a window 503, only one line different from the line including the process target pixel 502 is the line on which the division reading operation has been performed. Moreover, in a window 504, there is no line on which the division reading operation has been performed.

α and β in FIG. 7A indicate correction coefficient groups used when each pixel becomes the process target pixel. α is a coefficient group for pixels on which the addition reading operation has been performed. β is a coefficient group for pixels on which the division reading operation has been performed. The coefficient group α may include a single coefficient, or may include different coefficients according to the distances from the process target pixel. Similarly, the coefficient group β may include a single coefficient or may include different coefficients according to the distances from the process target pixel. However, the coefficient groups α and β are not equal.

In order to perform an appropriate noise reduction process, a coefficient corresponding to the process target pixel 502 may be changed based on coefficients corresponding to its neighboring pixels and the noise amounts of the neighboring pixels.

FIGS. 7B-1 and 7B-2 illustrate examples of the placement of specific numerals for the coefficient groups a and β in the window of FIG. 7A. FIG. 7B-1 illustrates a case where a single coefficient is used for the coefficient group α and a single coefficient having a different value from the coefficient group α is used for the coefficient group β. Specifically, two is assigned as the coefficient to all pixels of the coefficient group α. One is assigned as the coefficient to all pixels of the coefficient group β. Noise included in a pixel on which the addition reading operation has been performed is smaller than noise included in a pixel on which the division reading operation has been performed. Accordingly, if the value of the coefficient group α is set to greater than the value of the coefficient group β, the amount of noise included in a corrected signal can be reduced. FIG. 7B-2 illustrates a case where a plurality of different coefficients is used in the coefficient groups α and β. In this example, the coefficients are placed in such a manner as to implement a Gaussian filter in each of the coefficient groups α and β. The feature of the coefficient placement in FIG. 7B-2 is that the ratio of five coefficients of a row or column to which the coefficient group α is applied is 1:4:6:4:1, and the value of each element in a row or column to which the coefficient group β is applied is half the value of the case where the coefficient group α is applied to the row or column.

Figure 8:
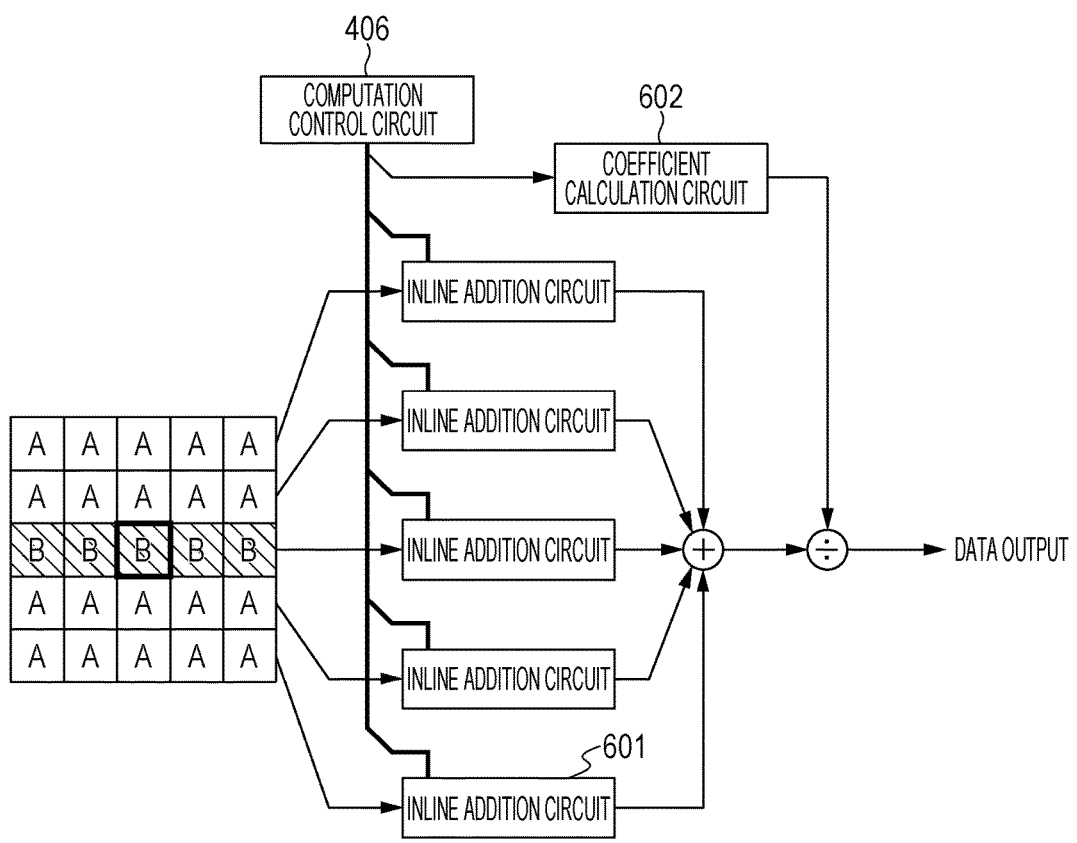
FIG. 8 diagram illustrating the configuration of a noise reduction circuit according to an embodiment.

FIG. 8 is a diagram illustrating a specific circuit example of the noise reduction circuit 407. An inline addition circuit 601 uses a coefficient from the computation control circuit 406 to do multiplication and addition. The detailed operation is described below. A coefficient calculation circuit 602 adds up all coefficients selected by the computation control circuit 406 and outputs the result. The sum of output results of the inline addition circuits 601 of the lines is divided by the output of the coefficient calculation circuit 602 to obtain a weighted addition average value as the output. The weighted addition average value is the output result of the noise reduction circuit 407. The data output of the circuit is substituted with the pixel value of the above-mentioned process target pixel 502 to perform the noise reduction process.

Figure 9:
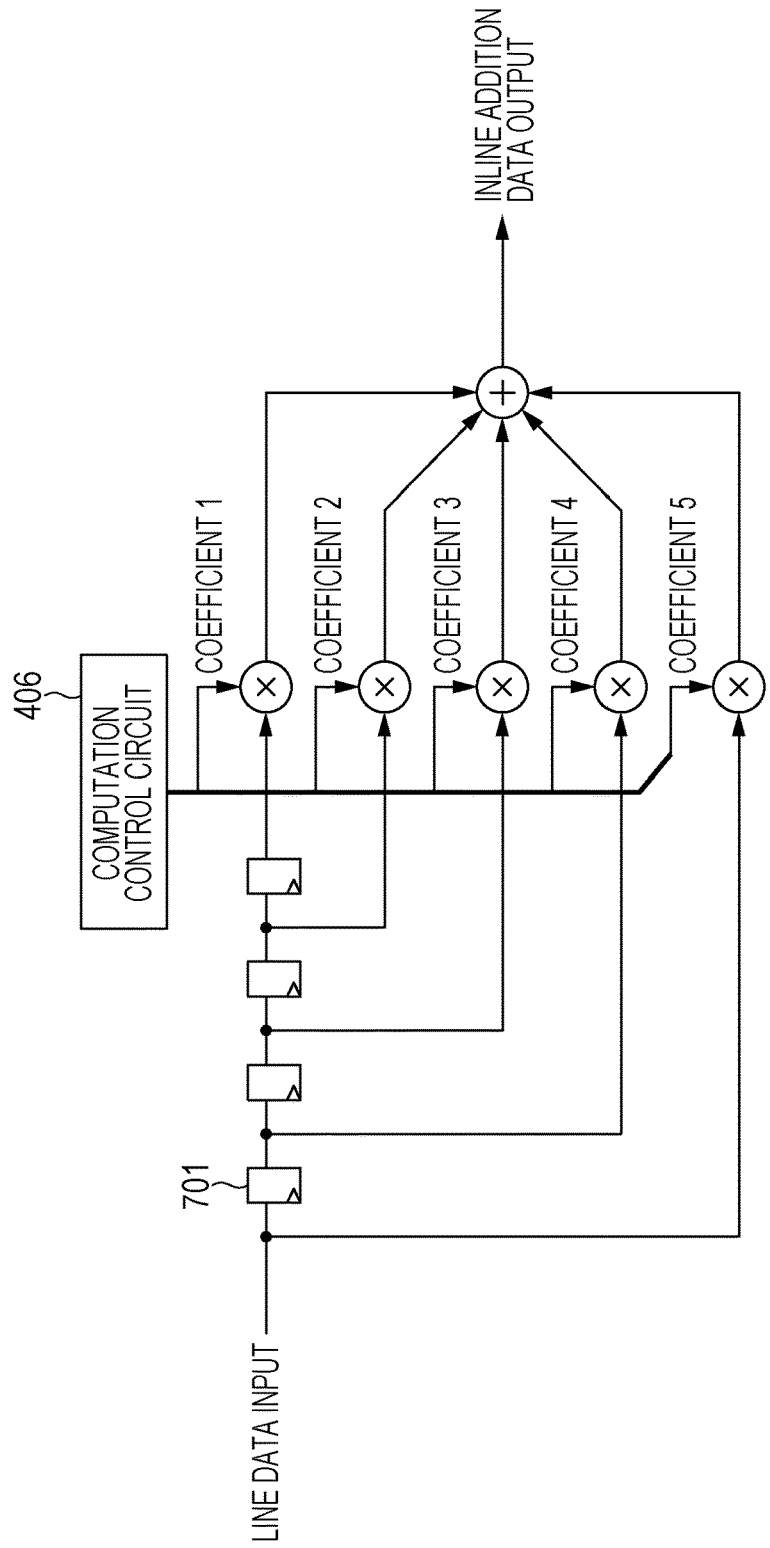
FIG. 9 is a diagram illustrating the configuration of an inline addition circuit according to an embodiment.

FIG. 9 is a diagram for explaining the operation of the above-mentioned inline addition circuit in detail. A delay element 701 delays a signal by one pixel. It is configured such that the delay element 701 is used to extract a pixel in the horizontal direction in a process window of the noise reduction circuit 407. Each pixel is multiplied by a coefficient transmitted from the computation control circuit 406 and added up. The above operation permits the inline addition circuit 601 to do the calculation.

As described above, according to the embodiment, a different correction coefficient group is used for a pixel signal obtained by a different reading operation to enable a correction. Consequently, when noise is reduced in one image obtained by combining the different reading operations, noise whose amount changes according to the reading operation can be effectively reduced.

(Second Embodiment)

The placement of coefficients according to a second embodiment is described with reference to FIG. 10. The configuration of an imaging apparatus of the embodiment is similar to the configuration according to the first embodiment. Therefore, its description is omitted. The second embodiment is different from the first embodiment in the method for calculating a weighted addition average in the noise reduction circuit 407.

Figure 10:
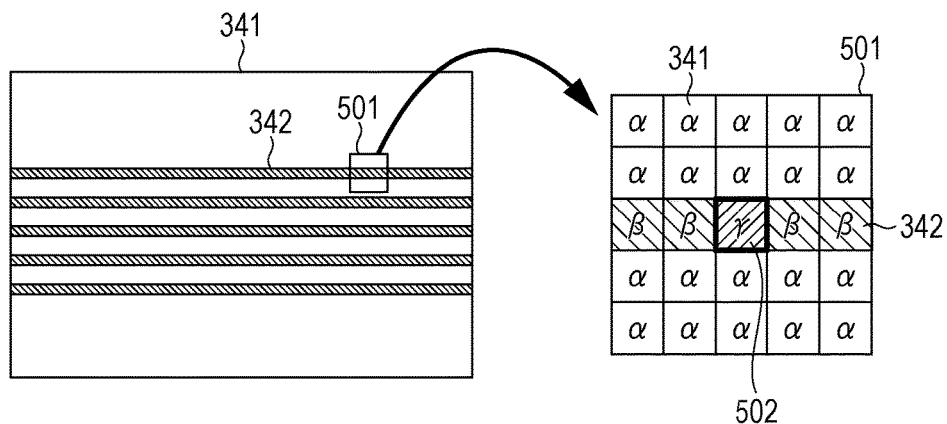
FIG. 10 is a diagram for explaining the setting of weighted coefficients based on a change of a reading device according to a second embodiment.

FIG. 10 illustrates the reading operations of an imaging device, and a process window of the noise reduction circuit 407 according to the embodiment. A reading operation of the process target pixel 502 is the same as that of pixels on the left and right. However, a coefficient γ that is different from a correction coefficient group (here, the coefficient group β)

assigned to the left and right pixels is multiplied to perform the noise reduction process on the process target pixel 502. In the calculation method of the noise reduction circuit 407, only the coefficient of a pixel targeted for the noise reduction process is different, and there is no change in the configuration of the circuit.

The coefficient is changed in the inline addition circuit 601 of a row including the pixel targeted for the noise reduction process in the noise reduction circuit 407. A coefficient 3 in FIG. 9 illustrating the circuit configuration of the inline addition circuit 601 is a coefficient in the middle of the row. In the embodiment, the noise reduction process is performed on a pixel located in the middle in a process window of 5×5. Hence, it is configured such that the embodiment is achieved by setting the coefficient 3 as the coefficient γ in the inline addition circuit of the row including the pixel targeted for the noise reduction process.

The coefficient γ can be set to a coefficient that does not depend on the reading operation. For example, if the coefficient group α are all two and the coefficient group β are all one, it is conceivable to assign five to the coefficient γ.

As described above, according to the embodiment, a correction can be made by assigning the coefficient γ that does not depend on the reading operation only to the process target pixel 502. The weighted addition averaging process is performed by assigning a coefficient that does not depend on the reading operation to a process target pixel; accordingly, the strength of the noise processing effect can be adjusted.

(Third Embodiment)

The placement of coefficients according to a third embodiment is described with reference to FIG. 11. The configuration of an imaging apparatus of the embodiment is similar to the configuration according to the first embodiment. Accordingly, its description is omitted here. The third embodiment different from the second embodiment in the method for calculating a weighted addition average in the noise reduction circuit 407.

Figure 11:
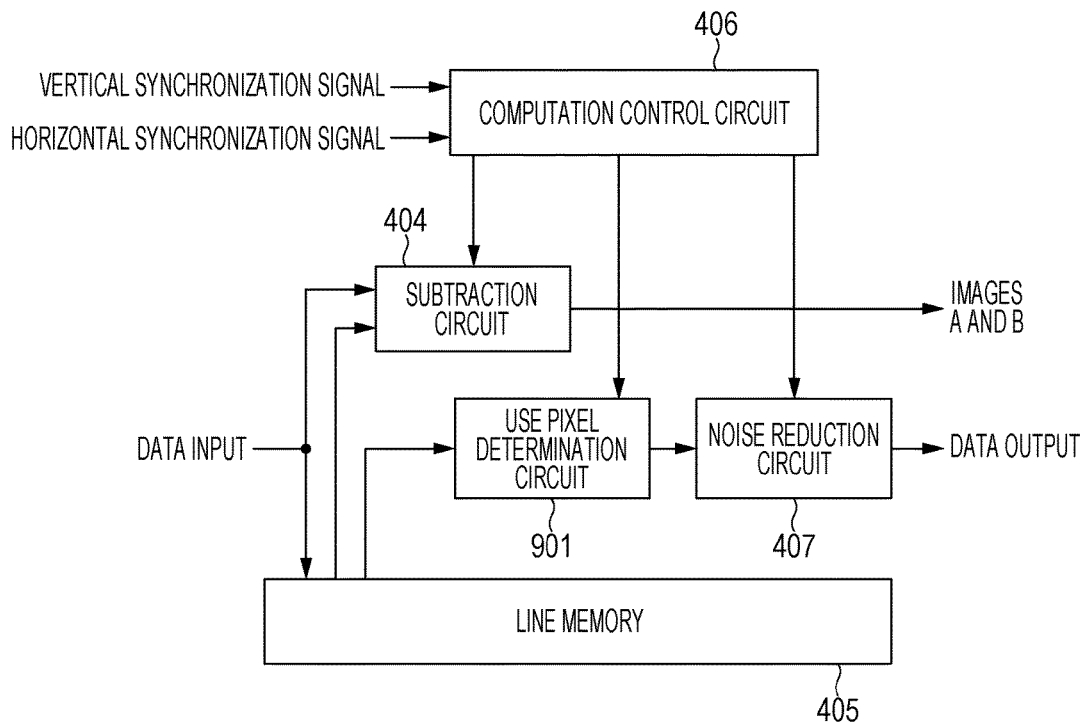
FIG. 11 is a diagram illustrating the configuration of a noise reduction circuit according to a third embodiment.

FIG. 11 illustrates the configuration of the noise reduction circuit 407 according to the embodiment. The embodiment is different from the first and second embodiments in the presence of a use pixel determination circuit 901. It is conceivable that this block is used to select only similar pixels to the pixel 502 targeted for noise processing and use them for the noise reduction process. Such a process is performed to enable the noise reduction process to be performed without damaging the structure of high frequencies in an image.

Figure 12:
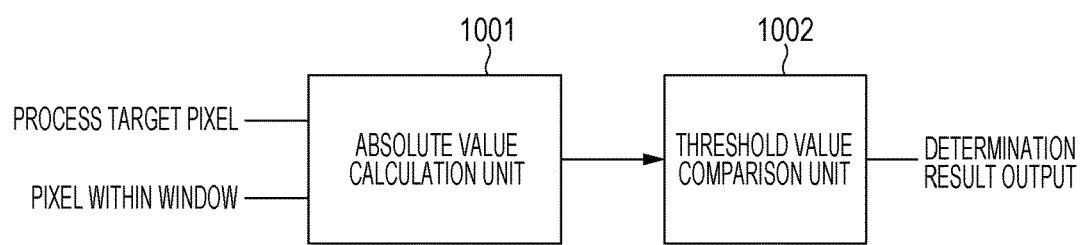
FIG. 12 is a diagram illustrating the configuration of a use pixel determination circuit according to an embodiment.

FIG. 12 is an example of the use pixel determination circuit 901. In an absolute value calculation unit 1001, the process target pixel 502 and its adjacent pixel within a window for the noise reduction process are input to calculate the absolute value of a difference between these pixel signals. In a threshold value comparison unit 1002, the calculation result of the absolute value calculation unit 1001 is input to compare it with an internally set threshold value. If the calculation result is greater than the threshold value, it indicates that the process target pixel and the adjacent pixel are dissimilar pixels. If the calculation result is smaller than the threshold value, it indicates that the process target pixel and the adjacent pixel are similar pixels. The similar pixel determination is performed on all pixels within the window to transmit the output of the determination result to the computation control circuit 406. The computation control circuit 406 can perform a process in which a dissimilar pixel is not included in the calculation of a weighted addition average by using a usual coefficient for a pixel whose determination result is similar and using zero as the coefficient for a pixel whose determination result is dissimilar. In the embodiment, the coefficient of the dissimilar pixel is set to zero. However, the coefficient can be a numeral other than zero. For example, when the coefficient is set to approximately 0.1, a process of preventing the loss of information is also possible. This method is used for weighted addition averaging described in the first or second embodiment; accordingly, it becomes possible to perform the noise reduction process considering both of the degree of similarity of a pixel and the reading operation of the pixel.

However, generally, as the number of pixels used for the noise reduction process increases, the noise reduction effect is enhanced. Hence, when the coefficient γ of the process target pixel 502 is always constant, more noise is seen only in a high spatial frequency part in an image. Hence, the coefficient γ of the process target pixel 502 is desired to be calculated based on the number of similar pixels. For simplification, let the weighted coefficient be a, let the number of similar pixels be n, let the noise amount of a pixel be σ, which is constant in a process window, and let the noise amount after the process be rσ. Then, the following equation 1 holds true.

[Math. 1]

$$\frac{\sqrt{a^2+n}}{a+n}\sigma = r\sigma \quad \text{(Equation 1)}$$

A value for a is calculated from equation 1. Accordingly, the coefficient γ can be obtained in accordance with the number of similar pixels. In a case of a condition where a solution of a does not exist, it can be set to, for example, one. However, in the embodiment, there is a difference between the amount of noise included in a pixel on which the addition reading operation has been performed and the amount of noise included in a pixel on which the division reading operation has been performed. Accordingly, even if the above equation 1 is used as it is, an appropriate coefficient γ cannot be obtained. Hence, in order to optimize the effect of the noise reduction process, the correction coefficient of each pixel and the rate of the noise amount of each pixel with reference to the amount of noise of a pixel signal obtained by simultaneously reading out signals of a plurality of photoelectric conversion units are reflected on the calculation of a correction coefficient of a process target pixel. The reference of the noise amount does not necessarily need to reference the noise amount of the pixel signal obtained by simultaneously reading out signals of the plurality of photoelectric conversion units, and any reading operation can be selected. The rate of the noise amount changes according to, for example, the reading operation of a pixel. The rate of the noise amount is determined based on coordinates of a pixel. For example, in the flowchart of FIG. 5B, the CPU 103 creates a setting for the reading operation for focus detection. The TG 102 is operated with the setting. Accordingly, the reading operation is switched. Hence, the same setting is transmitted to the computation control circuit 406 to enable the computation control circuit 406 to have the setting of the rate of the noise amount of each pixel by coordinates.

Figure 13:
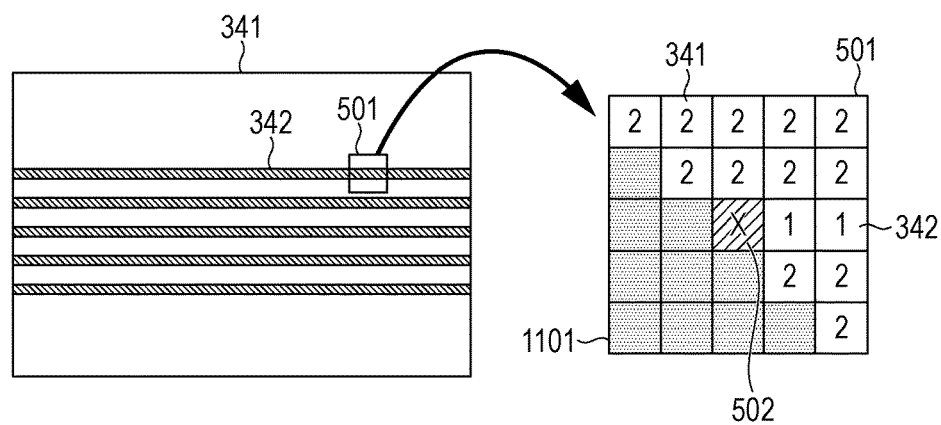
FIG. 13 is a diagram for explaining the setting of weighted coefficients based on a change of a reading device according to the third embodiment.

FIG. 13 illustrates the reading operations of the imaging device and a process window of the noise reduction circuit 407 according to the embodiment. A specific coefficient is assigned to each part of the process window. How to assign coefficients is the same as FIG. 7B-1. Pixels 1101 indicated in black are dissimilar pixels. These pixels have been determined to be dissimilar pixels and accordingly are not used for the noise reduction process.

Let the weighted coefficient be a. Let the number of pixels that have simultaneously read out images A and B be na. Let the number of pixels that have read out images A and B separately be nb. Let the rate of the noise amount of a pixel that has read out images A and B separately be s. Let the rate of the noise amount after the noise reduction process be one. The following equation 2 holds true.

[Math. 2]

$$\frac{\sqrt{r^2 a^2 + 2^2 n_a + s^2 1^2 n_b}}{a + 2n_a + n_b} = 1 \quad \text{(Equation 2)}$$

Let the rate of the noise amount of when images A and B are read out separately be N. In the example illustrated in FIG. 13, the above equation 2 is as follows:

[Math. 3]

$$\frac{\sqrt{N^2 a^2 + 2^2 * 12 + N^2 1^2 * 2}}{a + 2 * 12 + 2} = 1 \quad \text{(Equation 3)}$$

For example, the rate of the noise amount in accordance with the reading operation measured in advance and substituted for N. From this equation, a can be correctly calculated. A value for a obtained by the above calculation is used as the coefficient γ to make a calculation in the noise reduction circuit 407. Accordingly, noise can be suitably reduced.

As described above, according to the embodiment, the coefficient γ of the process target pixel 502 can be determined based on the number of pixels used for the noise reduction process, the correction coefficient of each pixel, and the rate of the noise amount of each pixel. Consequently, if the noise amounts of pixels adjacent to a process target pixel are not uniform, the difference in noise mount between process target pixels can be reflected in the noise reduction process. Accordingly, a more effective noise reduction process becomes possible.

(Fourth Embodiment)

The placement of coefficients according to a fourth embodiment is described with reference to FIG. 14. The configuration of an imaging apparatus of the embodiment is similar to the configuration according to the first embodiment. Therefore, its description is omitted. The fourth embodiment is different in pixels used for the calculation of a weighted addition average in the noise reduction circuit 407 and the coefficients.

Figure 14:
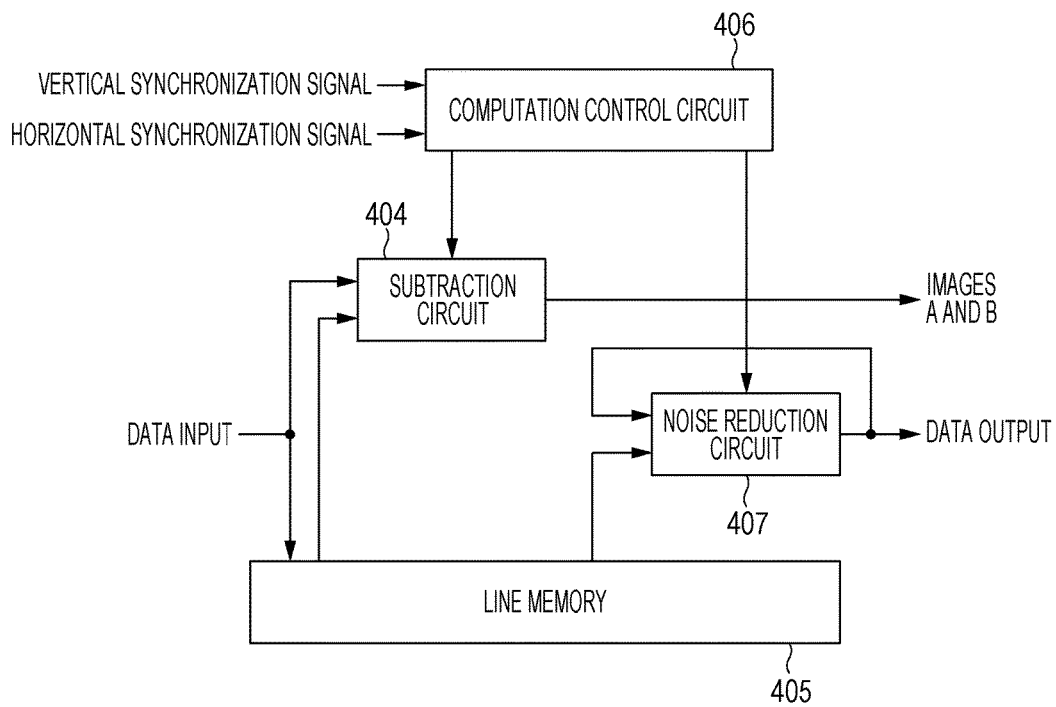
FIG. 14 is a diagram illustrating the configuration of a noise reduction circuit according to a fourth embodiment.

FIG. 14 illustrates the image processing unit 108 according to the embodiment. The noise reduction circuit 407 receives the input of data of the line memory or the output result of the subtraction circuit 404, and the output result of the noise reduction circuit 407 to calculate a weighted addition average and accordingly performs the noise reduction process. The noise reduction circuit 407 uses a processed pixel for weighted addition averaging. In this case, in terms of the noise level of the processed pixel, noise has been able to be reduced to a level equal to the noise level of a pixel used as reference in the noise reduction process.

Figure 15:
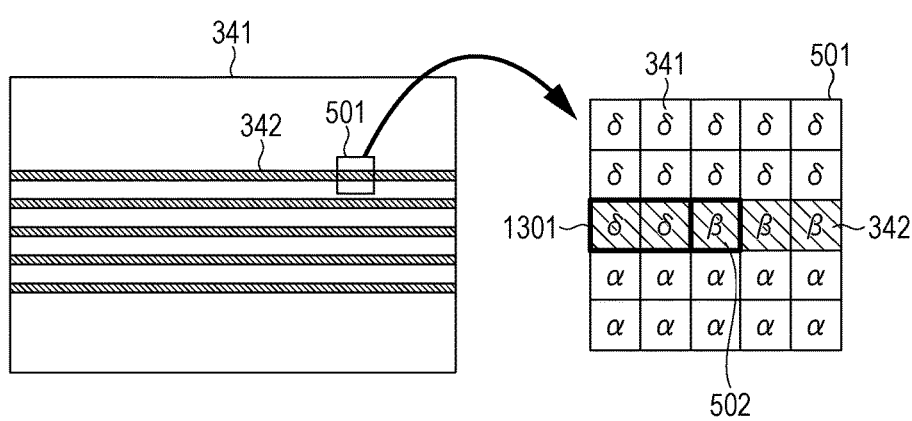
FIG. 15 is a diagram for explaining the setting of weighted coefficients based on a change of a reading device according to the fourth embodiment.

FIG. 15 illustrates the reading operations of an imaging device, a process window of the noise reduction circuit 407, and a coefficient of each pixel according to the embodiment.

In FIG. 15, the first reading operation and the second reading operation are performed on pixels in the middle row. Only the first reading operation is performed on pixels in the other rows. When considering that the noise reduction process is performed on pixels 1301 sequentially from the left, the pixels on the left of the process target pixel 502 are processed pixels. A signal of a pixel on which the noise reduction process has been performed is considered to be equal in noise amount irrespective of the reading operation. In such a case, in the calculation of a weighted addition average where the pixels 1301 are included, the calculation is made making coefficients used for the pixels 1301 the same as a coefficient group δ being coefficients used for the processed pixels in the area 341. Then, the noise reduction process can be performed more effectively.

Figure 16:
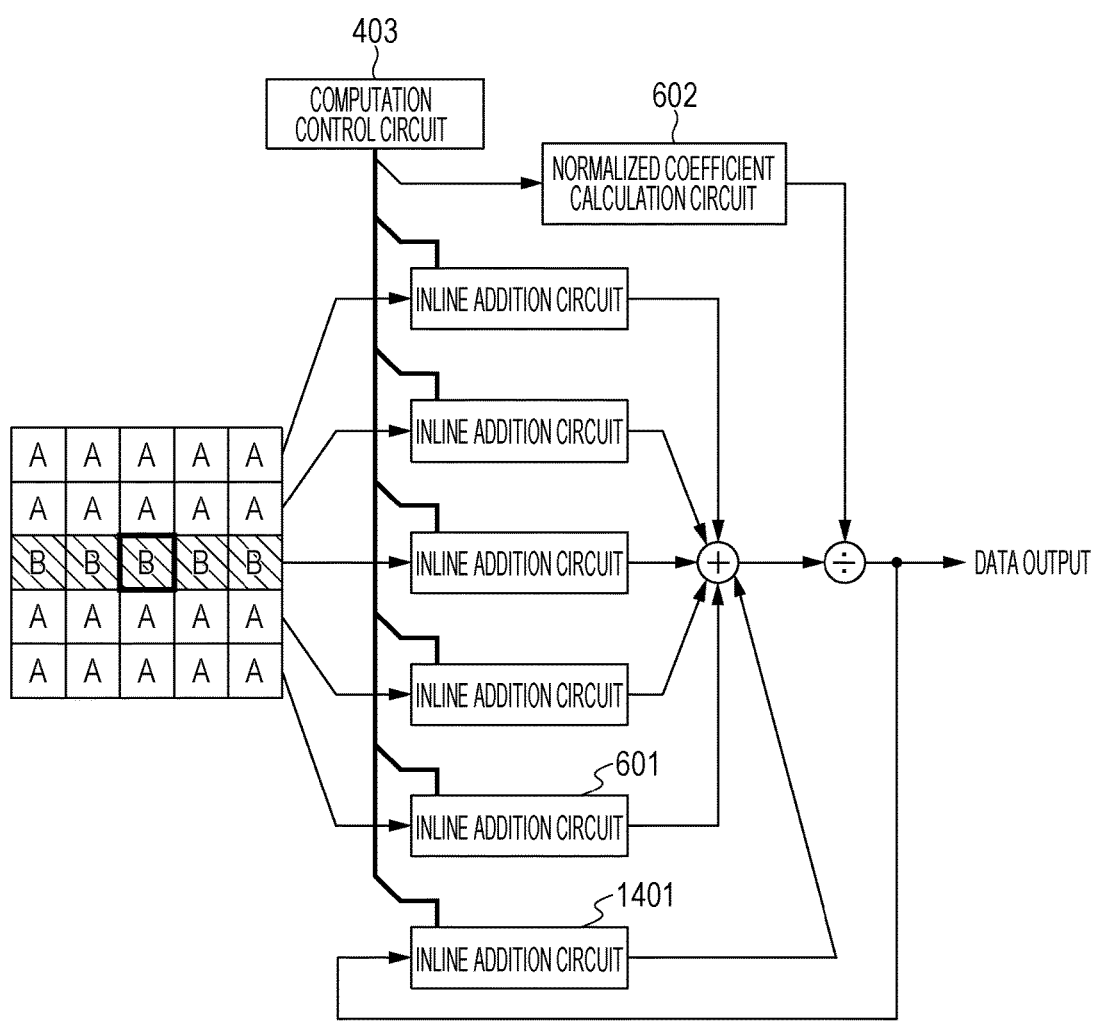
FIG. 16 is a diagram illustrating the configuration of the noise reduction circuit according to the fourth embodiment.

FIG. 16 illustrates an internal circuit of the noise reduction circuit 407. Data output is returned again to an inline addition circuit to be used for weighted addition averaging. An inline addition circuit 1401 adds the data output. A coefficient of two pixels located on the left of a process target pixel is set to zero in the computation control circuit to be unused for the calculation. Instead, the inline addition circuit 1401 for the data output can use the two pixels on the left of the process target pixel.

As described above, according to the embodiment, a pixel on which the noise reduction process has been performed by the noise reduction circuit 407 can be used for the noise reduction calculation of the next pixel. Consequently, noise can be reduced more effectively than a case where a pixel after the noise reduction process is not used.

Up to this point the embodiments have been described. The present invention is not limited to these embodiments. Embodiments can be modified and changed in various manners within the scope of the gist of the present invention. Moreover, the signal processing method described above may be used for a program incorporated in a computer, multifunctional mobile phone, and the like.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-234312, filed Nov. 30, 2015, which is hereby incorporated by reference herein in its entirety.

What is claimed is:

1. An imaging apparatus comprising:
an imaging device; and
a CPU configured to:
perform a first reading operation to obtain a first image signal corresponding to accumulated electric charge on a pixel included in a first area of the imaging device, and perform a second reading operation to obtain a second image signal and a signal for phase difference detection, corresponding to accumulated electric charge on a pixel included in a second area different from the first area, wherein the second reading operation is different from the first reading operation; and
correct, in a correction process, image signals based on signals obtained from the first and second areas by use of neighboring image signals obtained from a plurality of neighboring pixels located near a pixel targeted for the correction process, and coefficients corresponding respectively to the plurality of neighboring pixels,
wherein the CPU sets a coefficient corresponding to each of the plurality of neighboring pixels in accordance with the first or second reading operation executed on a neighboring pixel of the plurality of neighboring pixels.

2. The imaging apparatus according to claim 1, wherein the CPU makes the correction by use of a value obtained by multiplying the neighboring image signals obtained from the plurality of neighboring pixels by the coefficients corresponding respectively to the plurality of neighboring pixels, and adding values obtained by the multiplication.

3. The imaging apparatus according to claim 2, wherein the coefficient is selected from a plurality of predetermined coefficients.

4. The imaging apparatus according to claim 1, wherein the CPU makes the correction also by use of an image signal of the pixel targeted for the correction process and a coefficient corresponding to the pixel targeted for the correction process.

5. The imaging apparatus according to claim 4, wherein the coefficient corresponding to the pixel targeted for the correction process is different from the coefficients corresponding to each of the plurality of neighboring pixels.

6. The imaging apparatus according to claim 5, wherein the coefficient corresponding to the pixel targeted for the correction process is greater than the coefficients corresponding to each of the plurality of neighboring pixels.

7. The imaging apparatus according to claim 1, wherein the coefficients corresponding to each of the plurality of neighboring pixels change according to the number of the plurality of neighboring pixels used for the correction.

8. The imaging apparatus according to claim 1, wherein a level of noise included in a second image signal based on the signals read out by the second reading operation is different from a level of noise included in a first image signal based on the signals read out by the first reading operation.

9. The imaging apparatus according to claim 8, wherein the level of noise included in the second image signal based on the signals read out by the second reading operation is higher than the level of noise included in the first image signal based on the signals read out by the first reading operation.

10. The imaging apparatus according to claim 1, wherein a coefficient corresponding to the pixel targeted for the correction process is based on the coefficients corresponding to each of the plurality of neighboring pixels and noise amounts of the plurality of neighboring pixels.

11. The imaging apparatus according to claim 1,
wherein the CPU is configured to sequentially make the corrections to pixels included in the imaging device, and
wherein the corrections are made to image signals, corrected by the CPU, of the plurality of neighboring pixels by use of a common coefficient.

12. The imaging apparatus according to claim 1, wherein the CPU switches execution between the first reading operation and the second reading operation for each line of the imaging device.

13. The imaging apparatus according to claim 1, wherein at least the pixel included in the second area of the imaging device includes a plurality of photodiodes.

14. The imaging apparatus according to claim 13,
wherein the pixel included in the first area includes a plurality of photodiodes, and
wherein the first reading operation adds signals of two or more photodiodes of the plurality of photodiodes of the pixel and reads out the first image signal.

15. The imaging apparatus according to claim 13,
wherein the second reading operation reads out, from the plurality of photodiodes of the pixel included in the second area,
(i) a signal obtained by adding signals of a different combination of the plurality of photodiodes,
(ii) a signal of each single photoelectric conversion unit separately from the other photodiodes of the pixel having the photoelectric conversion unit, or
(iii) a signal obtained by adding signals of a first number of photodiodes, and a signal obtained by adding signals of a second number of photodiodes smaller than the first number, separately from the other photodiodes of the pixel having the photoelectric conversion unit, or a signal of any of the photodiodes separately from the other photodiodes of the pixel having the photoelectric conversion unit.

16. The imaging apparatus according to claim 13, wherein a signal obtained by adding signals of two or more photodiodes of the plurality of photodiodes of the pixel and reading out a resultant signal is set as an image signal.

17. The imaging apparatus according to claim 13, wherein a process of reading out a signal of a part of the plurality of photodiodes of the pixel separately from the other photodiodes of the pixel is performed on a signal of a different photoelectric conversion unit over several times, and a signal obtained by combining the signals of the photodiodes is set as an image signal.

18. The imaging apparatus according to claim 17, further comprising a CPU configured to detect a position of a subject based on the image signal based on the signals read out by the CPU,
wherein the CPU switches execution between the first reading operation and the second reading operation for each pixel in accordance with the position of the subject.

19. The imaging apparatus according to claim 1, wherein the CPU is capable of switching between the first reading operation and the second reading operation for the same pixel.

20. The imaging apparatus according to claim 19,
wherein the CPU configured to control the imaging device to set a focus detection area for detecting a distance to a subject, and
wherein the CPU switches execution between the first reading operation and the second reading operation for each pixel in accordance with a position of the set focus detection area.

21. An image processing method for an imaging apparatus having an imaging device, the image processing method comprising:
performing a first reading operation to obtain a first image signal corresponding to accumulated electric charge on a pixel included in a first area of the imaging device, and performing a second reading operation to obtain a second image signal and a signal for phase difference detection corresponding to accumulated electric charge on a pixel included in a second area different from the first area, wherein the second reading operation is different from the first reading operation; and
correcting, in a correction process, image signals based on signals obtained from the first and second areas by use of neighboring image signals obtained from a plurality of neighboring pixels located near a pixel targeted for the correction process, and coefficients corresponding respectively to the plurality of neighboring pixels,
wherein correcting includes setting a coefficient corresponding to each of the plurality of neighboring pixels in accordance with the first or second reading operation executed on a neighboring pixel of the plurality of neighboring pixels.

22. A non-transitory computer-readable storage medium storing a program to cause an imaging apparatus, having an imaging device, to perform an image processing method, the image processing method comprising:
performing a first reading operation to obtain a first image signal corresponding to accumulated electric charge on a pixel included in a first area of the imaging device, and performing a second reading operation to obtain a second image signal and a signal for phase difference detection corresponding to accumulated electric charge on a pixel included in a second area different from the first area, wherein the second reading operation is different from the first reading operation; and
correcting, in a correction process, image signals based on signals obtained from the first and second areas by use of neighboring image signals obtained from a plurality of neighboring pixels located near a pixel targeted for the correction process, and coefficients corresponding respectively to the plurality of neighboring pixels,
wherein correcting includes setting a coefficient corresponding to each of the plurality of neighboring pixels in accordance with the first or second reading operation executed on a neighboring pixel of the plurality of neighboring pixels.

* * * * *